United States Patent [19]

Papetti et al.

[11] Patent Number: 4,477,206

[45] Date of Patent: Oct. 16, 1984

[54] FLEXIBLE MATTRESS-LIKE ELEMENT USABLE AT BALLAST FOR IMMOBILIZING AND PROTECTING UNDERWATER PIPELINES

[75] Inventors: Andrea Papetti; Cesare Pedrini, both of Bologna, Italy

[73] Assignee: S.P.A. Officine Maccaferri gia Raffaele Maccaferri & Figli, Bologna, Italy

[21] Appl. No.: 300,529

[22] Filed: Sep. 9, 1981

[30] Foreign Application Priority Data

Sep. 16, 1980 [IT] Italy ............................. 68424 A/80
Mar. 5, 1981 [IT] Italy ............................. 52997/81[U]

[51] Int. Cl.$^3$ .......................... F16L 1/04; E02B 3/12
[52] U.S. Cl. ........................................ 405/172; 405/19
[58] Field of Search .................. 405/16, 17, 19, 157, 405/172; 428/256

[56] References Cited

U.S. PATENT DOCUMENTS

| 1,165,194 | 12/1915 | Maccaferri | 405/16 |
| 1,874,567 | 8/1932 | Mechlin | 405/19 |
| 3,788,253 | 1/1974 | Rickettson | 405/19 X |

FOREIGN PATENT DOCUMENTS

| 498115 | 9/1950 | Belgium | 405/17 |
| 1463743 | 2/1977 | United Kingdom | 405/172 |
| 1475682 | 6/1977 | United Kingdom | 405/19 |

OTHER PUBLICATIONS

"Gabions:. Economical, Environmentally Compatible Bank Control", Civil Engineering-ASCE, Jan. 1979, pp. 58-61.

Primary Examiner—Cornelius J. Husar
Assistant Examiner—Nancy J. Stodola
Attorney, Agent, or Firm—Sughrue, Mion, Zinn, Macpeak & Seas

[57] ABSTRACT

A flexible mattress-like element usable as ballast or a load for immobilizing and protecting underwater pipelines, includes an outer flexible envelope, preferably made from a non-woven fabric, covering at least one gabion which is made from double-twist, hexagonal-mesh wire netting in the form of a somewhat-flattened parallelepiped and is filled with a mixture of stones or pebbles with a sand-, filler-, and bitumen-based mastic. The composition of the mastic is such that it is fluid at 150° C. to 180° C., semi-fluid at 100° to 140° C., plastic at 10° to 50° C., semi-plastic at temperatures of from 0° C. to −10° C., and tends to become rigid at temperatures below −10° C. Each gabion is made from panels of netting in which the portions of wires which are twisted together are preferably arranged transverse the length of the gabion, that is, parallel to the axis of the pipeline to be immobilized and protected.

22 Claims, 9 Drawing Figures

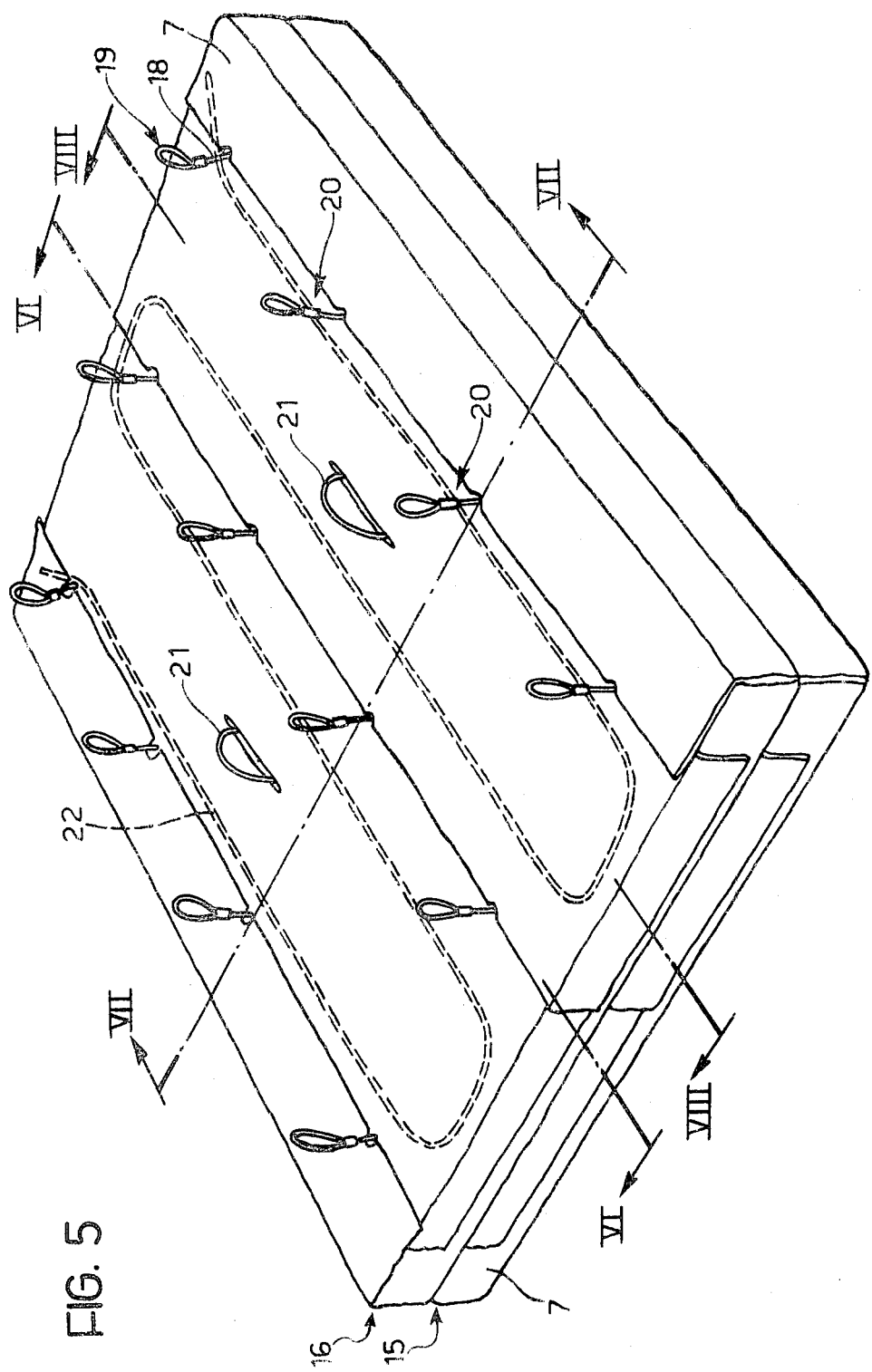

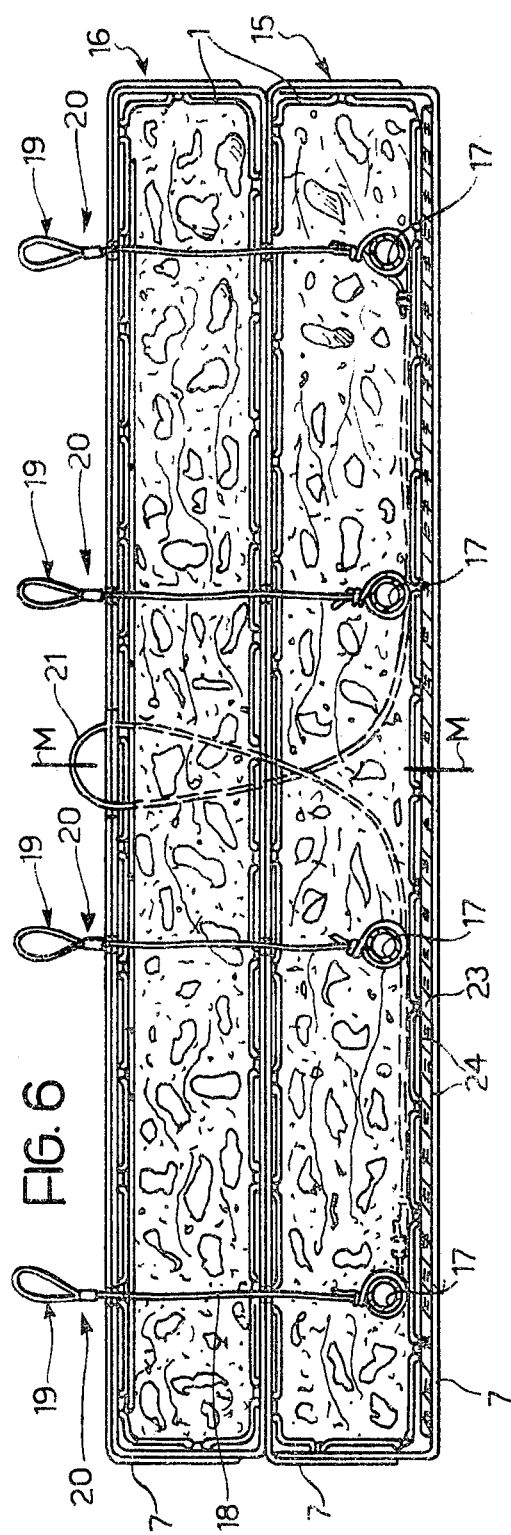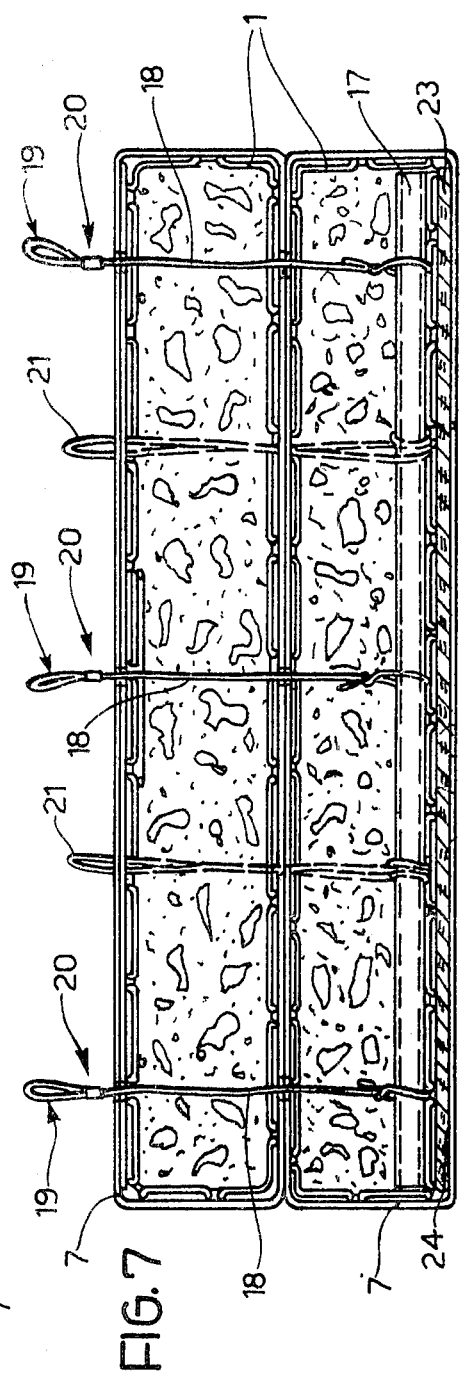

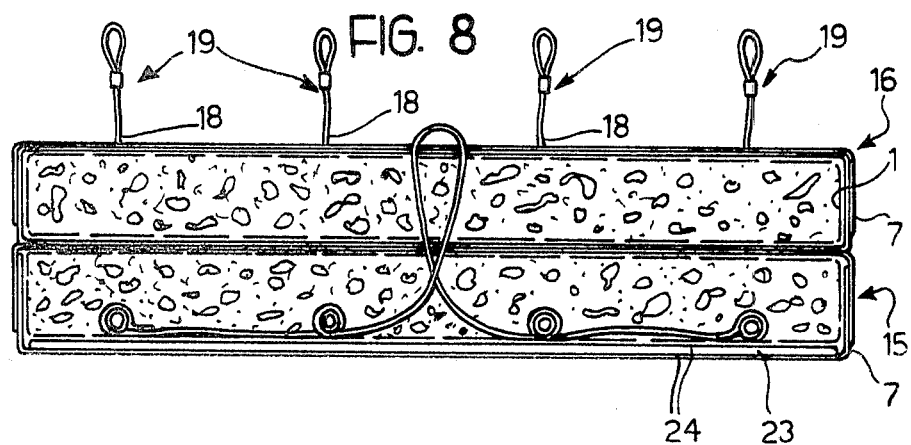
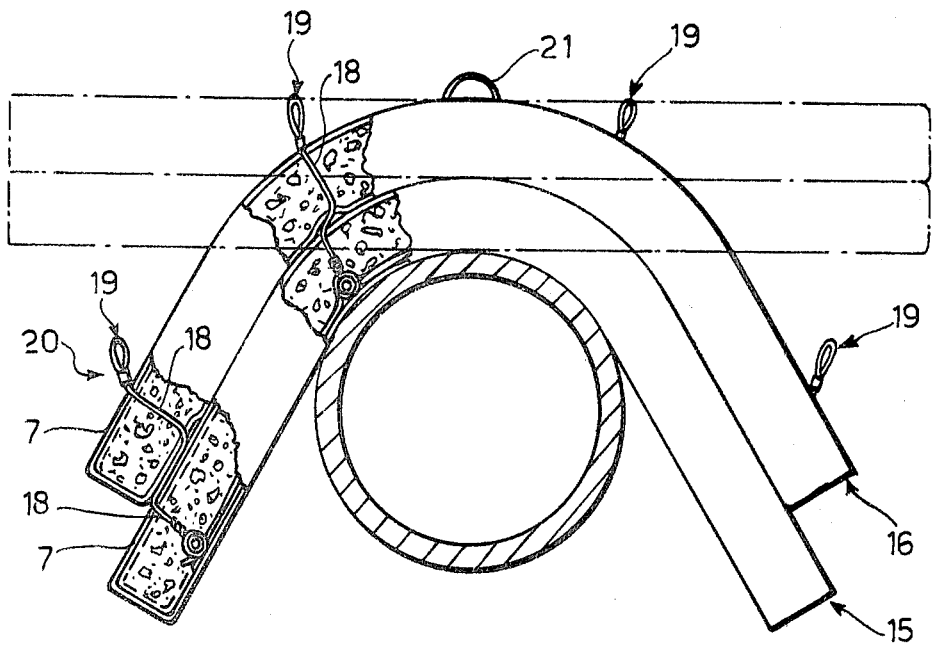

FLEXIBLE MATTRESS-LIKE ELEMENT USABLE AT BALLAST FOR IMMOBILIZING AND PROTECTING UNDERWATER PIPELINES

The present invention relates to a flexible mattress-like element usable as ballast for immobilising and protecting underwater pipelines.

Elements are already known from U.K. Pat. No. 1,276,468 which are usable as ballast or load to prevent, at least partially, the movement of pipelines laid on the sea bed, so that these pipelines do not become displaced by wave and current action, and to avoid fracturing of the pipes resulting in serious damage and hazards to shipping, especially when the pipelines in question carry gas or liquids under pressure.

These known elements include an envelope made from a flexible outer skin of, for example, hemp, which is bound and reinforced by a netting made preferably from polypropylene, and contains a mixture of loose aggregate and a suitable material, such as bitumen or cement, which sets to bind the aggregate and form a rigid mass therewith after the element has been laid on the underwater pipeline.

The use of the elements described above allows damage to the pipeline to be avoided, since the elongate bodies which are laid on the latter are initially flexible, not rigid. These bodies adhere to the upper part of the tubular wall of the pipeline and gradually adopt its shape, acquiring a permanent stable shape after a certain period of time, due to the setting of the mixture which fills the envelope.

This structure has the serious disadvantage that the element laid on the pipeline loses any trace of flexibility in a short time.

Consequently, if material is removed from that part of the sea bed on which the edges of the element laid on the pipeline rest, this element cannot deform further and the edges cannot fall to block the continuing erosion. It remains, therefore, in unstable equilibrium and may be displaced by oscillations of the pipeline, the action of marine currents, or by being fouled by anchors or nets. This seriously prejudices the integrity of the pipeline which risks being put dangerously under tension and/or being deprived of ballast.

Moreover, it is noted that the nature of the outer envelope of these known elements does not allow them to be filled before receiving the charge of settable material, nor does it allow their filling with an aggregate consisting of materials, such as pebbles, gravel, broken stones, or the like, which are available almost anywhere, but requires the preliminary preparation of the mixture of aggregate and settable material which, in practice, must necessarily include an aggregate consisting of finely-broken material of high specific gravity, such as magnetite or haematite, which is expensive and rarely readily available.

The object of the present invention is to provide an element usable as a ballast or load for protecting underwater pipelines and resisting their displacement, which is free from the aforesaid disadvantages, has a very robust structure even when it has large dimensions and hence is heavy in weight, uses low-cost materials which are easily available anywhere, and has a structure and composition which enables the element itself to be made easily and, above all, gives it a certain degree of flexibility even after it has been laid.

A further object of the invention is to form a mattress-like element of the type specified above which is provided with means for facilitating its transport, its laying, and its possible removal, if necessary, from the pipeline which it protects.

According to the present invention, the main object is achieved by providing a flexible mattress-like element usable as ballast or load for immobilising and protecting underwater pipelines, of the type which includes a flexible envelope containing a mixture including an aggregate of solid elements and a material which is settable with a lowering of its temperature, and is characterised by a combination of the following characteristics:

the flexible envelope consists of an outer cover able to retain the settable material forming part of the mixture when this material is in the fluid state;

the envelope covers at least one gabion of double-twist, hexagonal-mesh wire netting having a flattened parallelepiped shape, in which the hexagonal-mesh netting of the panels forming the gabion is arranged so that the portions along which the various wires of the netting are twisted together preferably extend transverse the gabion, and the mixture is disposed within the gabion and is constituted by an aggregate consisting of stones or pebbles and a material which is settable with a lowering of its temperature and consists of a sand-, filler-, and bitumen-based mastic, the compositon of said mastic being such that it is fluid at 150° C. to 180° C., semi-fluid at 100° C. to 140° C., plastic at 10° to 50° C., semi-plastic at 0° C. to −10° C., and tends to become rigid at temperatures below −10° C.

According to a preferred embodiment of the invention, the flexible mattress-like elment is characterised in that it is provided with means constituted by rigid elongate supporting members which are disposed at intervals in positions adjacent the bottom wall of the gabion close to the envelope, and are oriented parallel to the dimension of the element which, after laying, is intended to coincide with the longitudinal direction of the pipeline, and are further constituted by a plurality of coupling members connected to the anchoring members and having portions which project from the surface of the outer envelope opposite that close to the bottom wall of the gabion, said portions being provided with means, such as eyes or hooks, attachable to external lifting devices.

According to another embodiment, the supporting members may consist of metal tubes, bars, or profiled sections of metal or other material disposed within the gabion adjacent its respective bottom wall. The coupling members may comprise ropes or cables which are attached to the anchoring members and extend through the entire thickness of the gabion, each member having a portion which projects from the respective cover and is formed, at least in said portion, to allow their coupling to the external lifting devices.

When the flexible mattress-like element consists of two similar, superimposed mattress-like elements, the supporting means are disposed close to the bottom of the gabion forming part of the lower element, and the ropes or cables constituting the coupling members extend through the entire structure of the upper mattress element and have a length such that they project from the upper face of the latter, even after considerable flexing of the entire element which results in mutual relative sliding of the lower and upper elements.

Further characteristics and advantages of the invention will become clear from the description which follows, by way of non-limiting example, with reference to several practical embodiments illustrated in the appended drawings, in which:

FIG. 5 is a perspective view of a flexible mattress-like element according to a further embodiment of the invention.

FIGS. 6, 7 and 8 are sections taken on the lines VI—VI, VII—VII, and VIII—VIII, respectively in FIG. 5, and FIG. 9 is a partially-sectioned front view which shows the element of FIG. 5 deformed by bending after being laid on an underwater pipeline.

In all the drawings, corresponding elements are indicated by the same reference numeral.

Figure 1:
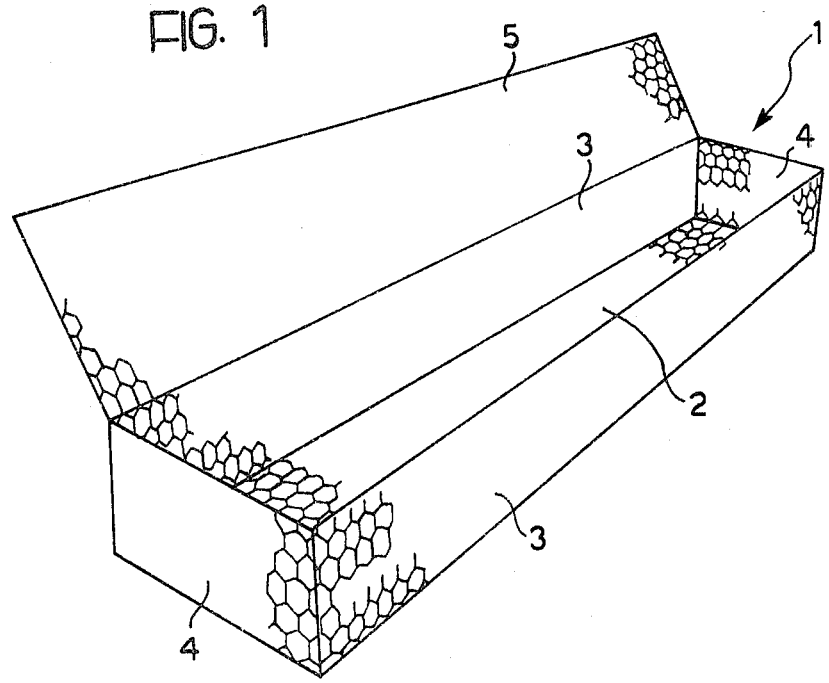
FIG. 1 is a perspective view of a gabion forming part of an element according to the invention.

FIG. 1 shows a gabion 1 in the form of a parallelepiped container made from double-twist, hexagonal-mesh wire netting. This container usually has a length of 4 to 10 meters, a width of 1 to 3 meters, and a depth of 0.15 to 0.6 meters, according to the diameter of the pipeline which it is desired to immobilise and protect by an element of which the gabion constitutes one of the essential components.

Figure 2:
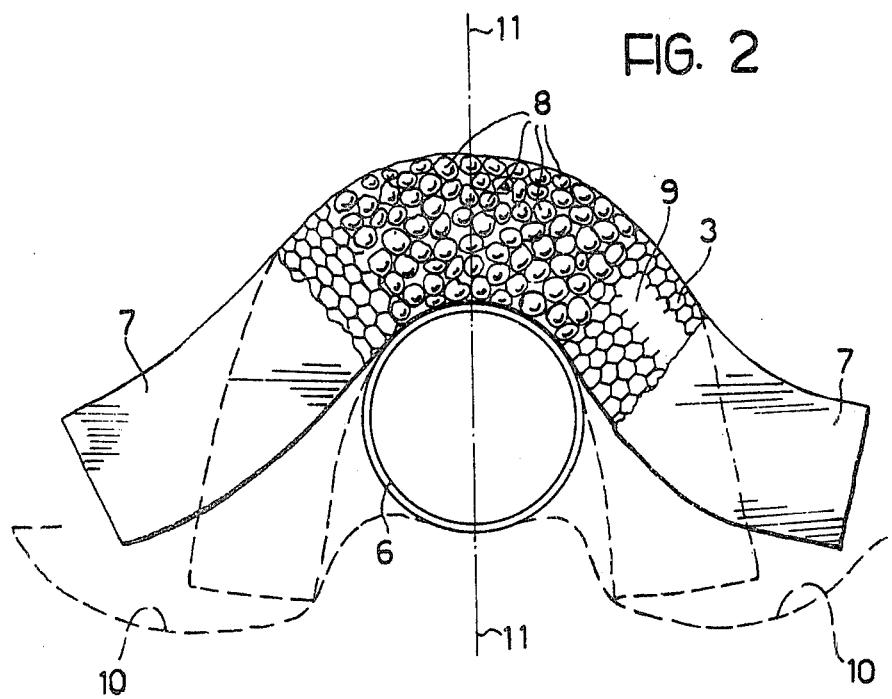
FIG. 2 is a partially-sectioned view of an the element according to the invention, including the gabion of FIG. 1, laid over an underwater pipeline resting on the sea bed.

The bottom 2 and longitudinal sidewalls 3 of the gabion are generally formed from a so-called "panel" of wire netting with hexagonal meshes which are oriented so that the portions along which the various wires are twisted together extend in the longitudinal direction of the gabion. The lid 5 is constituted by panels of wire netting, also of hexagonal mesh, in which the portions along which the various wires are twisted together extend perpendicular to the length of the gabion instead. This characteristic is chosen to favour the flexibility of the element made-up using the gabion described, when the element itself is laid over a tubular pipeline 6 on the sea bed, or on the bed of a lake or river, as illustrated in FIG. 2.

In the latter it can also be seen that the gabion 1 is covered externally by at least one layer of fabric 7, which may usefully consist of a so-called "non-woven" fabric. The gabion is loaded with pebbles, gravel or broken stones 8 which are immersed in a mastic mass 9 introduced into the gabion once it has been filled with the aggregate of pebbles, gravel or stones, preferably by pouring in from the top while the gabion is inserted in a kind of mould.

The ratio of the quantity of the load of pebbles, gravel or broken stones to the quantity of poured mastic may conveniently be such that the mastic occupies 30 to 40% by volume of the gabion.

In order to obtain the desired result, it is necessary to use a sand-, filler-, and bitumen-based mastic with a composition such that its consistency is fluid at 150° C. to 180° C., semi-fluid at 100° to 140° C., plastic at 10° C. to 50° C., semi-plastic at temperatures of 0° C. to −10° C., and tends to become rigid at temperatures below 10° C.

By way of clarification, it should be explained in short that by the terms fluid, semi-fluid and plastic mastic consistencies are meant mastics with respective viscosities of: $10 + 5 \times 10^3$ poise; $10^2 + 5 \times 10^5$ poise and $10^6 + 10^{10}$ poise.

An example of the composition of a hot-pouring hydraulic bituminous mastic usable in making an element according to the invention, is as follows:

| | |
|---|---|
| 1. natural sand or crushed material with a grain size up to 5 mm | 65–74% by weight |
| 2. calcareous filler (cement, hydrated lime, calcareous powder) all of which can pass through an ASTM No. 80 sieve and at least 75% of which can pass through an ASTM No. 200 sieve | 8–12% by weight |
| 3. bitumen - a mixture of two bitumens, 80/100 PEN. and 180/200 PEN. respectively, which is variable from case to case | 18–23% by weight |
| Total | 100% by weight |

After being lowered into water and laid over the pipeline 6, an element made according to the criteria explained previously assumes the shape shown by continuous lines in FIG. 2. Due to its flexibility, this element may deform, as shown in broken outline, should wave or current action cause erosion of the bed of the sea, lake or river in the zone indicated by the reference numeral 10. This deformation increases the downward thrust which the element exerts on the pipeline, and also increases the stability of the element itself.

In order to enhance the flexibility of the element, and at the same time safeguard the durability of the parts most subject to tension as a result of its being laid over the pipeline 6, a zone 12 (see FIG. 3) extending between the two longitudinal side walls 3 close to the lid 5 in correspondence with the transverse median plan 11—11 is filled only with mastic. This measure assists flexing of the mattress-like element since it allows the pebbles or stones 8 constituting the aggregate immersed in the mastic to migrate upwardly from the zone of compression.

Figure 3:
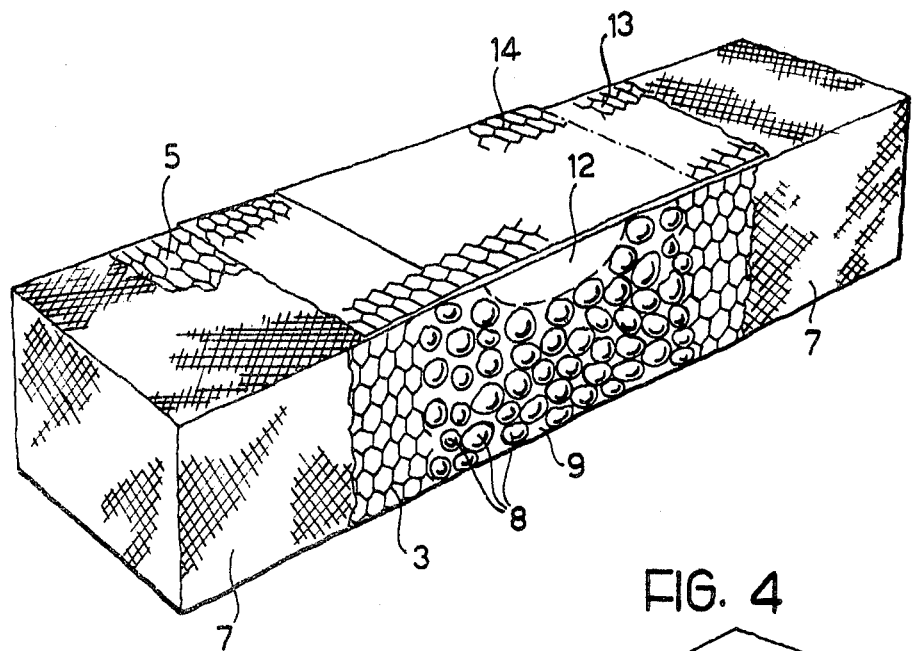
FIG. 3 is a partially-sectioned side view similar to FIG. 2 showing a variant of the element according to the invention.
Figure 4:
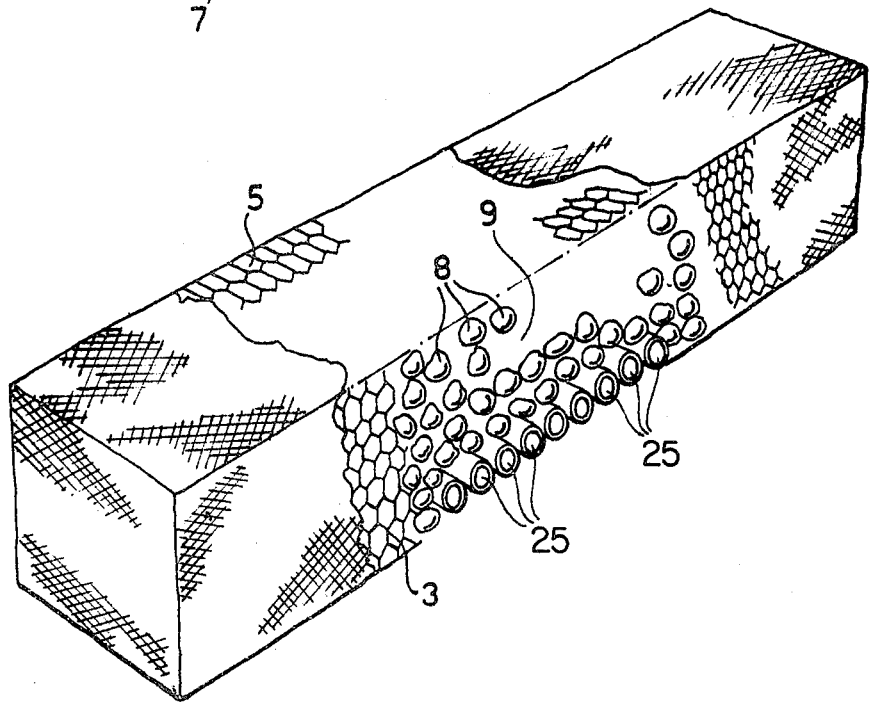
FIG. 4 is a view similar to FIG. 3 which shows the flexible mattress-like element according to another embodiment.

The strength of the upwardly-facing wall of the element is conveniently increased by superimposing a pair of supplementary panels 13, 14, respectively, on the lid 5 of the gabion, as also shown in FIG. 3. Conveniently, the panel 13 is shorter than the lid 5 and the panel 14 is shorter than the panel 13, their transverse end edges being disposed symmetrically with respect to the transverse median plane 11—11 of the gabion. The length of these supplementary panels may, however, be equal to that of the lid 5. The latter may be an element separate from the gabion, like the panels 13,14.

Another means of enhancing the flexibility of the element according to the invention consists of arranging one or more layers of resilient bodies 25 symmetrically on opposite sides of the plane 11—11 at the bottom of the gabion. The bodies may be made, for example, from a suitable plastics material, or with a deformable structure able to form cavities close to the bottom which diminish in volume with the flexing of the elements due to their being laid over the underwater pipeline.

The element according to the embodiment illustrated in FIGS. 5 to 9 is composed of two elements 15, 16 respectively, which are substantially identical and, with regard to their basic structure, are like the previously described element illustrated in FIGS. 1 to 4. Each of these elements, in fact, includes an outer cover 7 of non-woven fabric which covers a gabion 1 made from double-twist hexagonal-mesh wire netting filled with a mixture of stones or pebbles and a sand-, filler-, and bitumen-based mastic.

Four steel tubes 17 rest on the bottom of the gabion of the lower element 15, being arranged symmetrically on opposite sides of the median plane M—M of the element intended to contain the axis of the pipeline to be protected in use of the mattress-like element. Three cables 18 are anchored to each of the tubes 17 at regular intervals by means of looped fastenings. Each cable 18 extends through the entire thickness of the elements 15,16 and, projecting for a certain length from the upper face of the latter, ends with an eye or loop 19 engageable by a hook of a lifting device (not illustrated). The length of that portion of cable 18 projecting from the upper face of the element 16 is sufficient to ensure that the eye or loop 19 projects from the upper face of the element 2 even under the conditions of considerable deformation of the entire element which may occur after it has been laid on an underwater pipeline, as illustrated in FIG. 9.

The number and arrangement of the cables 18 depend on the size and weight of the matress-like element, and the characteristics of the method used for laying the element on the underwater pipeline. The permissible load for each cable is established from time to time in dependence on these characteristics. In the case under consideration, this will be about one-sixth of the total weight for the cables 18 of the central rows 20.

In addition to the cables 18, two so-called "emergency" coupling members constituted by cables 21 are anchored to the tubes 17. The opposite ends of each cable 21 are anchored to the tubes 17 furthest from the median plane M—M of the element. These cables 21 pass below the tubes 17 closest to the plane M—M and extend through the entire thickness of the elements 15,16 to emerge finally from the upper face of the latter in the form of loops engageable by hooks of a lifting device.

The strength of these cables 21 is greater than that of the cables 18, since they must be able to allow the entire mattress-like element to be lifted in an emergency, even years after being laid and even at the cost of rendering the element no longer usable.

The upper metal reinforcement of each gabion, as well as being constituted by a respective lid and by one or more panels of hexagonal-mesh netting, includes reinforcing cables or ropes 22 (of steel and nylon or other material, respectively) which are arranged in a serpentine path and are interwoven with the meshes of the lid and any reinforcing panels of the gabion. The direction of the serpentine path extends conveniently transverse the dimension of the mattress-like element intended to be parallel to the length of the pipeline to be protected.

A protective layer is interposed between the outer cover of non-woven fabric and the bottom wall of the gabion of the element 15, in order to prevent corrosion by the flow of electric currents between the pipeline and the netting of the gabion itself. This protective layer consists of a thin layer of bituminous mastic 23 between two panels of non-woven fabric 24.

Naturally, many variants will be possible.

This will be the case, for example, in flexible mattress-like elements with a single layer, elements composed of more than two layers, elements in which the rigid supporting members are constituted, not by steel tubes, but by profiled metal sections or bars of other material arranged to be parallel to the pipeline to be protected after mattress-like element has been laid, or even elements in which the outer cover of non-woven fabric surrounds, in a single element, a plurality of gabions placed side-by-side and arranged so that their longitudinal dimensions are parallel to the median vertical plane of the element intended to contain the longitudinal axis of the pipeline to be protected.

The lower protective layer may be constituted by sheets or so-called "panels" of butyl rubber, neoprene, "Teflon", or other materials resistant to sea water and having electrically-insulating properties.

The lid of each gabion may be integral with the structure forming the bottom and sidewalls, or may be constituted by a separate panel of double-twist hexagonal-mesh netting joined to the rest of the gabion by sewing with metal wire.

Preferably, the orientation of the wires forming the hexagonal-mesh netting is such that those portions along which adjacent wires are twisted together extend parallel to the supporting members constituted by the metal tubes 17.

What is claimed is:

1. A flexible mattress-like element usable as ballast for immobilising and protecting underwater pipelines comprising at least one gabion made from top, bottom, side and end panels of double-twist hexagonal-mesh wire netting and having an elongated flattened parallelepipied form with a longitudinal axis and a mixture disposed within said gabion constituted by an aggregate of stones or pebbles and a sand, filler, and bitumen based mastic wherein the wires forming at least said top panel of hexagonal-mesh netting of said gabion are twisted together along portions which extend traverse to said longitudinal axis of said gabion whereby the flexibility of the element is enhanced when draped over an underwater pipeline.

2. An element as defined in claim 1 further comprising an outer cover surrounding said gabion and capable of retaining said mixture in said gabion when said mixture is in a fluid state.

3. An element as defined in claim 1 wherein said top panel of said gabion comprises lid, said lid being reinforced by at least one supplementary panel superimposed thereon and made from hexagonal-mesh netting arranged in the same manner as said netting of said lid.

4. An element as defined in claim 3 wherein said supplementary panel is shorter than said lid.

5. An element as defined in claim 1 wherein said mastic contains a calcerous filler.

6. An element as defined in claim 1 wherein said element has a zone filled exclusively with mastic, said zone extending on opposite sides of a median plane extending transversely to the longitudinal axis of said gabion across the entire width of the gabion and is situated immediately below said top panel.

7. An element as defined in claim 1 wherein said gabion contains at least one layer of resilient bodies situated close to said bottom panel of said gabion on opposite sides of a median plane extending transverse to said longitudinal axis of said gabion.

8. An element as defined in claim 7 wherein said resilient bodies are comprised of hollow tubes of elastic material.

9. An element as defined in claim 2 wherein said outer cover is comprised of at least one layer of nonwoven fabric.

10. An element as defined in claim 1 wherein said mastic occupies between 30 and 40 percent of said gabion by volume.

11. An element as defined in claim 1 wherein means to facilitate lifting of said gabion are provided comprising rigid elongated supporting members disposed in said gabion at intervals adjacent said bottom panel of said gabion and extending transverse to said longitudinal axis of said gabion and a plurality of coupling members connected to said supporting members and having portions projecting through said top panel of said gabion for engagement by external lifting means.

12. An element as defined in claim 11 wherein said supporting members are comprised of metal tubes.

13. An element as defined in claim 11 wherein said coupling members are comprised of elongated flexible members.

14. An element as defined in claim 13 wherein each of said elongated flexible members has a loop at each end with a loop at one end engaging a respective supporting member and loop at the other end being located outside of said gabion for engagement by external lifting means.

15. An element as defined in claim 14 wherein each coupling member is comprised of rope of synthetic resin material.

16. An element as defined in claim 11 wherein said gabion and said mixture therein have a composite weight and each coupling member has a tensile strength sufficient to support only a portion of the composite weight.

17. An element as defined in claim 16 wherein four supporting members are located in said gabion with two of said supporting members being parallel and disposed symmetrically with respect to a vertical median plane of said element which extends transverse to said longitudinal axis and wherein three of said coupling members are attached to each of said two supporting members closest to said median plane with each of said coupling members having a tensile strength sufficient to support at least one-sixth of said composite weight.

18. An element as defined in claim 11 further comprising at least one supplementary coupling member engaging each of said supporting members and having a tensile strength adapted to support said composite weight.

19. An element as defined in claim 18 wherein said supplementary coupling member is comprised of a rope fastened at each end to each of said supporting members adjacent said end walls of said gabion and passing beneath the other of said supporting members and projecting through said top panel of said element in the form of a projecting loop.

20. An element as defined in claim 1 further comprising an outer cover surrounding said element and a protective sheet of electrically-insulating material resistant to the action of sea water being disposed between said outer cover and said bottom panel of said gabion.

21. An element as defined in claim 20 wherein said protective sheet includes two layers of non-woven fabric and a layer of bituminous mastic therebetween.

22. An element as defined in claim 11 further comprising an additional element disposed in superimposed relation on said first mentioned element and cover means on each of said elements with said coupling members having a length sufficient to enable said portions which project through the upper panel of said first mentioned element to project through the upper panel of said additional superimposed element even when the two elements are bent over a pipeline to be immobilized and protected.

* * * * *